May 12, 1959     J. T. MARSHALL     2,886,315
DEVICE FOR TEACHING DIVING TECHNIQUES
Filed Oct. 9, 1956     2 Sheets-Sheet 1

John T. Marshall
INVENTOR.

May 12, 1959  J. T. MARSHALL  2,886,315
DEVICE FOR TEACHING DIVING TECHNIQUES
Filed Oct. 9, 1956  2 Sheets-Sheet 2
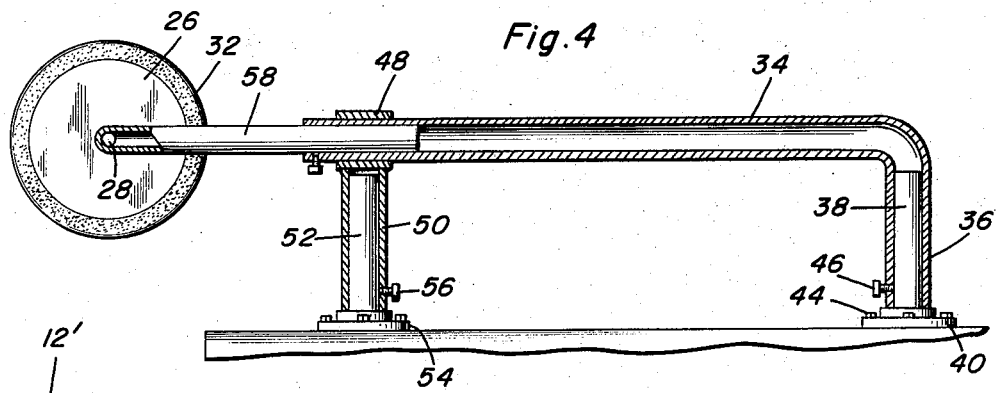
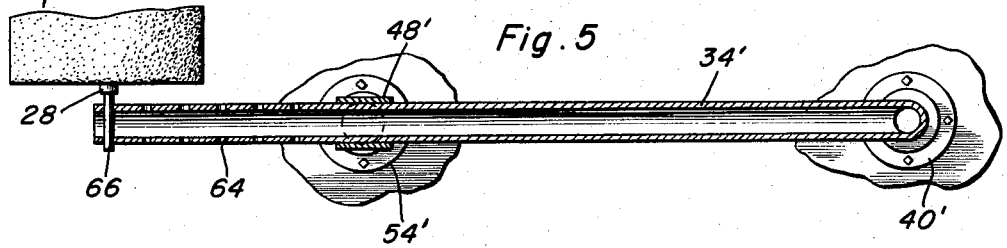
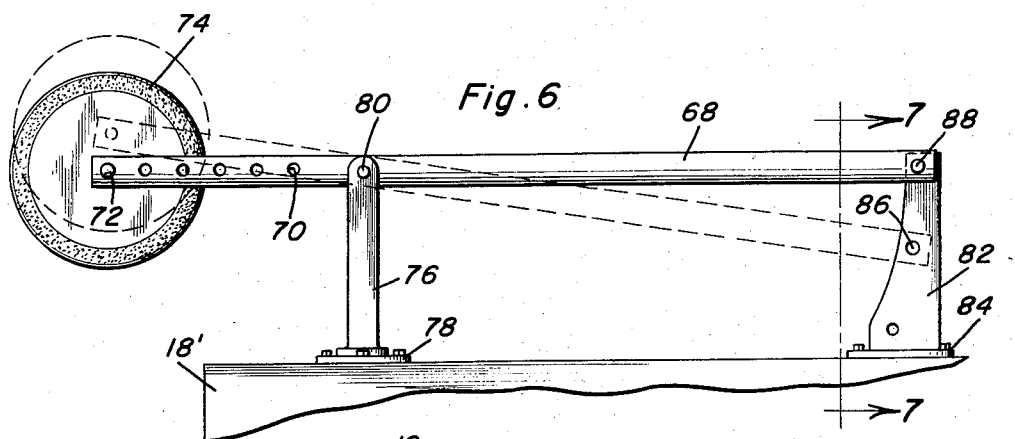
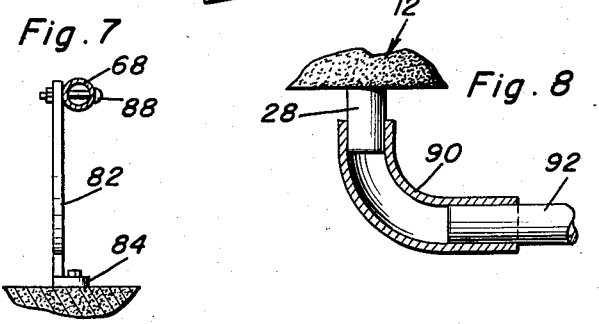
John T. Marshall
INVENTOR.

United States Patent Office 2,886,315
Patented May 12, 1959

2,886,315

DEVICE FOR TEACHING DIVING TECHNIQUES

John T. Marshall, Gainesville, Fla.

Application October 9, 1956, Serial No. 614,944

3 Claims. (Cl. 272—1)

This invention generally relates to a teaching or instructional aid and more particularly to such a device for teaching proper diving techniques.

The primary object of the present invention is to provide a round object or obstruction extending over the side edge of a pool or other similar body of water for a person to roll over while becoming accustomed to entering water head foremost in the proper diving position.

When a person begins to learn to dive, it sometimes occurs that the person will land in the water on his stomach thus causing the beginner to lose confidence and actually become afraid to dive or attempting to dive. It is also a problem among beginners that they usually are embarrassed from what they think is awkward appearance in a failure to execute a proper position and movement when diving. Thus, it is the primary object of the present invention to provide a device for teaching the proper diving techniques which will prevent a student diver or beginner or any one else from landing on his stomach while attempting a plain front dive from the side of a pool, dock, float or alongside any body of water for overcoming the fear of attempting a dive and also quickly conditioning the student diver in the correct form and instill confidence in him thus enabling him to reach a stage in his training where the device is no longer required for performance of various dives with the proper form and safety.

Other objects of the present invention will reside in its simplicity of construction, adaptation for its particular purposes, use as a recreational as well as a teaching aid and its adjustability for use in various positions and with different sized persons.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a longitudinal, vertical sectional view taken substantially upon a plane passing along section line 4—4 of Figure 2 illustrating further structural details of the present invention;

Figure 5 is a detailed sectional view similar to Figure 4 but taken from a top plan illustrating a modified form of the present invention;

Figure 6 is a side elevational view illustrating a further modified form of the invention;

Figure 7 is a detailed sectional view taken substantially upon a plane passing along section line 7—7 of Figure 6 illustrating the details thereof; and Figure 8 is a detailed sectional view illustrating another manner of supporting the rotatable drum.

Figure 1:
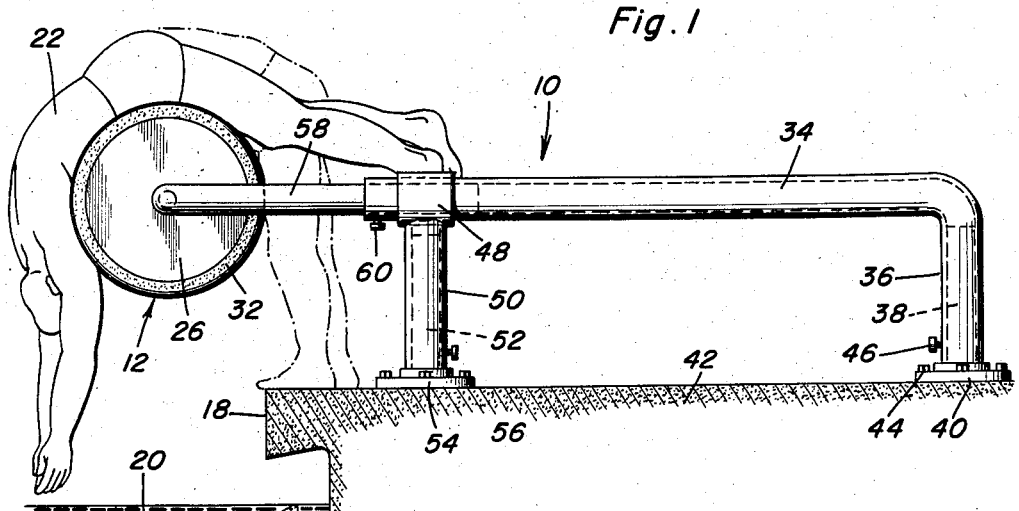
Figure 1 is a side elevational view of the teaching aid of the present invention installed alongside of a pool and generally illustrating a diver employing the device.
Figure 2:
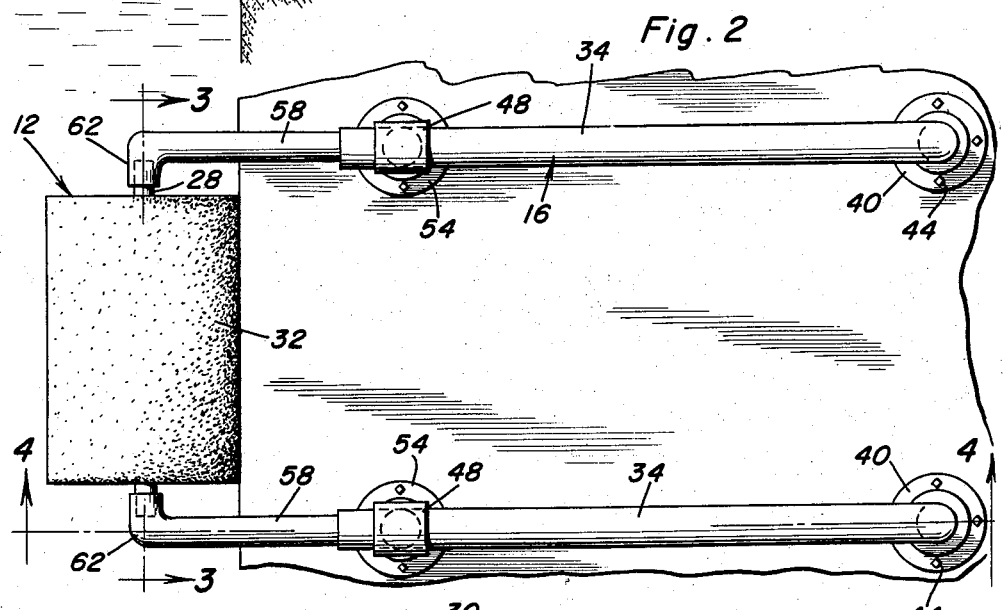
Figure 2 is a plan view of the construction of Figure 1.

Referring now specifically to the drawings, the numeral 10 generally designates the teaching aid of the present invention. The teaching aid includes a rotatable drum generally designated by the numeral 12 together with a supporting structure generally designated by the numeral 16 at each end of the drum 12 for supporting the same adjacent the side edge 18 of a swimming pool filled with water 20 in the usual manner for teaching a diver 22 the proper manner of entering the water 20 from the edge of the pool 18 thus teaching the diver 22 to enter head foremost and assuring that the remainder of the body will follow at a proper angle.

The drum 12 includes a generally cylindrical member 24 having end walls 26 mounted on a transverse axle 28. The ends of the cylindrical member 24 are provided with peripheral projecting portions 30 which retain an inflatable cylindrical member 32 thereon. The inflatable cylindrical member 32 is in the form of a cushion or any other suitable arrangement which may be inflated for providing a soft cushion over the edge of the drum or cylindrical member 24 whereby engagement of the diver 22 with the cylindrical drum will be cushioned. It is pointed out that the rubber inflated portion 32 may be inflated by any desired means to any desired pressure.

Each of the support arrangements 16 includes an elongated tubular pipe generally disposed in horizontal position and designated by the numeral 34. The rear end of the pipe 34 is downturned as indicated by the numeral 36 and telescopes over an upstanding member 38 having a mounting flange 40 at the bottom thereof which is secured to the supporting surface 42 by fastening bolts 44. A set screw 46 is provided for adjusting the vertical position of the pipe 34 in relation to the upstanding member 38.

Adjacent the front end of the pipe 34 is provided a sleeve 48 having an integral depending tubular member 50 for telescopic engagement over an upstanding member 52 having a mounting flange 54 on the bottom thereof and secured to the supporting surface 32 in the same manner as the flange 40. A set screw 56 is provided through the tubular member 50 for adjusting and locking the elevational position of the forward end of the horizontal pipe 34.

Telescopically received in the free end of the pipe 34 is a smaller pipe member 58 secured in adjusted position by a set screw 60 in the pipe 34. The outer end of the pipe 58 is turned inwardly as designated by the numeral 62 for telescoping over the ends of the axle 28 thus rotatably journalling the axle 28 and permitting vertical adjustment of the drum 12 as well as adjustment in a horizontal plane to vary the position in relation to the edge of the pool 18 thus enabling the diver to adjust the device to the desired position.

Figure 5 illustrates a modified form of the invention with the exception that the pipe 34' extends continuously outwardly and is provided with the plurality of longitudinally spaced transverse apertures 64 for receiving a projecting pin 66 mounted on the outer ends of the axle 28' of the drum 12' thus journaling the drum 12' for rotation and permitting vertical adjustment as well as adjustment in a horizontal plane.

Figure 6 illustrates another modified form of the present invention including a pair of generally horizontally disposed pipes 68 having a plurality of spaced longitudinal apertures 70 adjacent the front end thereof for selectively receiving a pin 72 on the drum 74 which is a similar construction as that illustrated in Figure 5. An upstanding member 76 having a supporting flange 78 is provided with a pivotal connection 80 at its upper end for engagement with the pipe 68 thereby pivotally supporting the pipe 68.

The rear end of the pipe 68 is supported by an upstanding bracket 82 having a mounting flange 84 and a series of arcuately arranged apertures 86 for receiving a fastening pin 88 which also extends through the rear end of the pipe 68 thus permitting angular adjustment of the pipe 68 about pivot pin 80 thus raising and lowering the drum 74 in an arcuate manner for orientating the drum 74 in the desired relation to the side edge of the pool 18'.

Figure 3:
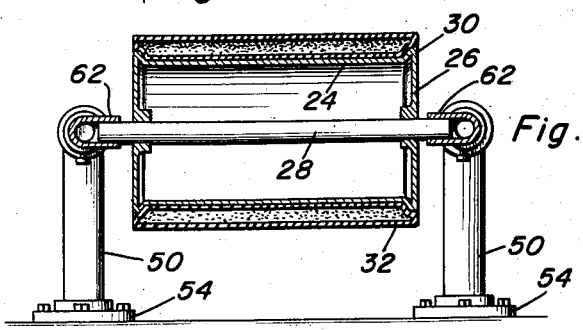
Figure 3 is a transverse, sectional view taken substantially upon a plane passing along section line 3—3 of Figure 2 illustrating the details of construction thereof.

Figure 8 illustrates a modified form of supporting means for the drum axle 28 in Figure 3 and this means includes an L-shaped pipe fitting 90 having one end telescoped over the axle 28 and the other end telescoped over a pipe or rod member 92 which may be telescopically received in the pipe 34 of Figure 1. This construction may be substituted for the pipe member 58 having the inturned end 62 thereon.

The drum 12 may be 20 to 30 inches in diameter and 30 to 60 inches long and is disposed from 6 to 30 inches outwardly of the side of the pool. The diver with hands extended above his head bends over allowing his body to lay on the cylinder or drum. He may slide over or the drum may roll over so that he enters the water hands first followed by head, shoulders, hips, legs and feet. If the cylinder is of the proper dimensions and adjusted as to distance from the edge of the pool and height, the pupil will automatically enter the water in diving position. The cylinder may be constructed of rubber or plastic material and may have a metal drum covered with inflated rubber or plastic or be an inflated cylinder with a hole through the center for an axle. The frame will be preferably of metal of such a material which will prevent corrosion and rusting and may be attached to the supporting surface or by any suitable means and may be made portable by the employment of suction cups or the like. The device may be employed as a recreational device since children will use the device in practice diving and rolling off of the drum 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for assisting in the instruction of persons in diving techniques comprising a generally horizontally disposed barrier, means adjustably mounting the barrier adjacent the edge of a body of water capable of receiving divers, said means being adjustable for varying the elevational and horizontal position of the barrier, said barrier being arranged in overlying relation to the body of water and at an elevation approximating waist region of the divers when the divers are disposed on a supporting surface below the barrier thus necessitating a forward bending and rolling movement of the divers when passing over the barrier thereby orientating the bodies of the divers in a proper diving position when entering the body of water, said barrier being in the form of an enlarged cylindrical member mounted for rotation about a horizontal axis for facilitating the rolling of the divers over the barrier into the water, said cylindrical member having a soft resilient cushion on the periphery thereof for cushioning the contact of the divers therewith.

2. The combination of claim 1 wherein said cushion is an inflatable member.

3. A device for teaching student divers the techniques of diving comprising a supporting structure on a horizontal surface adjacent a body of water, said structure defining a runway generally perpendicular to the edge of the body of water, said structure including a pair of spaced supporting members terminating in free ends spaced above the horizontal surface and in overlying relation to the body of water, an enlarged horizontal drum freely rotatably supported between the free ends of the supporting members and forming a horizontal barrier across the runway with the top surface of the drum disposed at an elevation approximating the waist region of a diver walking on the horizontal surface along the runway towards the body of water thereby requiring that an approaching diver move in a forward bending and rolling manner over the drum whereby the diver will leave the drum in substantially a tangential relation to the outer edge thereof whereby the diver will enter the surface of the water in substantially perpendicular relation thereto.

References Cited in the file of this patent

UNITED STATES PATENTS

| | | |
|---|---|---|
| 450,186 | Peterson | Apr. 14, 1891 |
| 1,495,402 | Daniel | May 27, 1924 |
| 1,586,222 | Sellner | May 25, 1926 |